(12) United States Patent
Matsuoka

(10) Patent No.: US 8,452,260 B2
(45) Date of Patent: May 28, 2013

(54) METHODS AND APPARATUS FOR UNLOCKING AN ELECTRONIC DEVICE

(75) Inventor: Yoshimichi (yomi) Matsuoka, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 293 days.

(21) Appl. No.: 12/731,891

(22) Filed: Mar. 25, 2010

(65) Prior Publication Data

US 2011/0237220 A1    Sep. 29, 2011

(51) Int. Cl.
*H04M 1/66*    (2006.01)
(52) U.S. Cl.
USPC ........................ 455/411; 348/14.03

(58) Field of Classification Search
USPC .......................................... 455/411; 370/338
See application file for complete search history.

(56) References Cited

U.S. PATENT DOCUMENTS

| | | | |
|---|---|---|---|
| 2002/0190947 A1* | 12/2002 | Feinstein | 345/158 |
| 2004/0101112 A1* | 5/2004 | Kuo | 379/88.01 |
| 2004/0204018 A1* | 10/2004 | Kuo | 455/550.1 |
| 2005/0110773 A1* | 5/2005 | Chapman et al. | 345/174 |
| 2009/0215494 A1* | 8/2009 | Causey et al. | 455/564 |

* cited by examiner

*Primary Examiner* — Marcos Batista

(57) ABSTRACT

The present disclosure provides methods and apparatus for unlocking an electronic device. In an embodiment, a process causes a device such as a smartphone to receive a sound input from a fixed position microphone and determine if the device should be unlocked based on a comparison of the sound input with a previously defined sound input.

21 Claims, 4 Drawing Sheets

FIG. 1
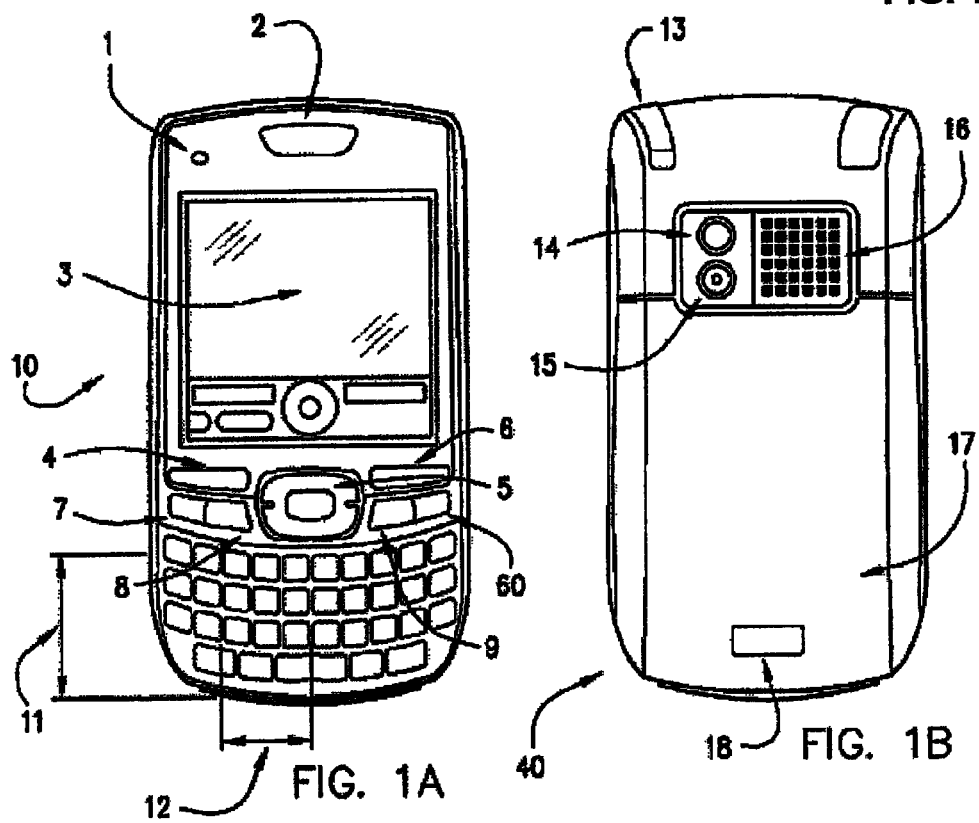
FIG. 1A FIG. 1B
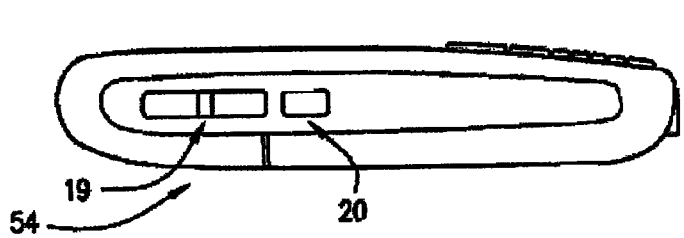
FIG. 1C
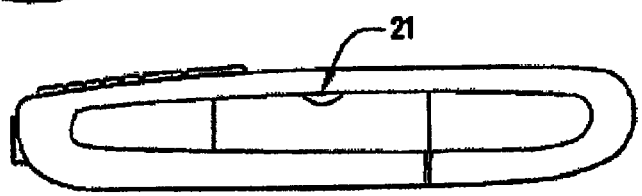
FIG. 1D
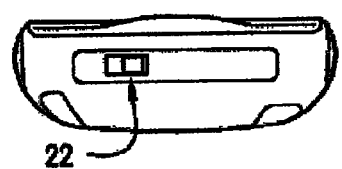
FIG. 1E
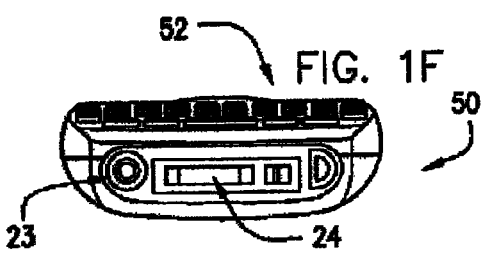
FIG. 1F

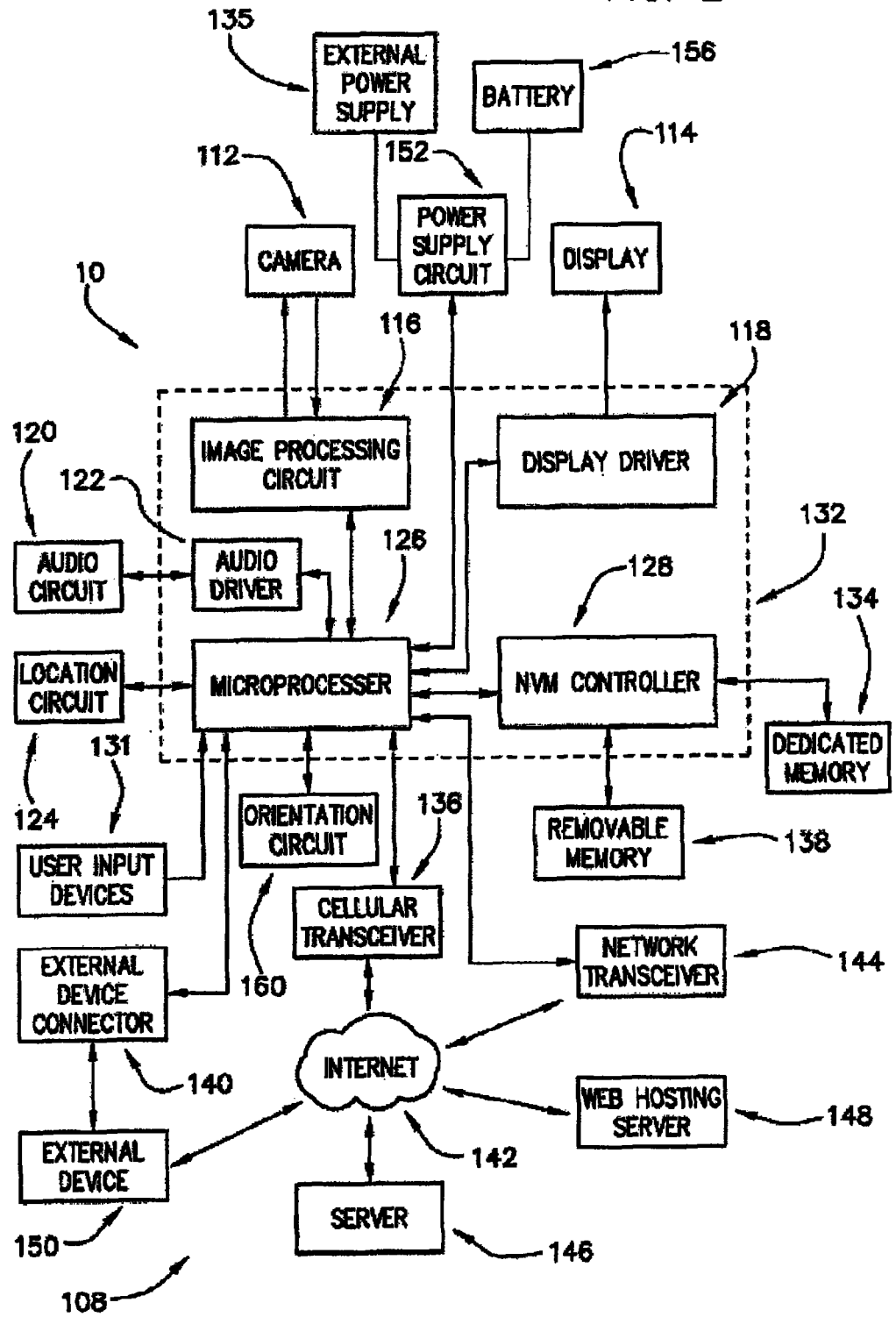

METHODS AND APPARATUS FOR UNLOCKING AN ELECTRONIC DEVICE

TECHNICAL FIELD

The present application relates in general to security for electronic devices and more specifically to methods and apparatus for unlocking an electronic device.

BACKGROUND

Electronic devices, such as smartphones, often contain sensitive information such as phone numbers, appointments etc. As a result, these devices often include a way to lock and unlock the device. For example, some devices require a code to be entered such as a four digit number. Similarly, some entrances, such as house or car entrances, require some type of unlock code for an electronic lock.

However, these types of codes are often easily guessed by using digits significant to the user such as birthdays, anniversaries, addresses, etc. What is need is a more unique way to unlock an electronic device.

SUMMARY

The present disclosure provides methods and apparatus for unlocking an electronic device such as a smartphone or electronic door lock. In an embodiment, a process causes a device such as a smartphone to receive a sound input from a fixed position microphone and determine if the device should be unlocked based on a comparison of the sound input with a previously defined sound input.

BRIEF DESCRIPTION OF THE FIGURES

FIGS. 1A-1F illustrate an example mobile computing device.

FIG. 2 is a block diagram of circuitry for the example computing device.

DETAILED DESCRIPTION

Figure 3:
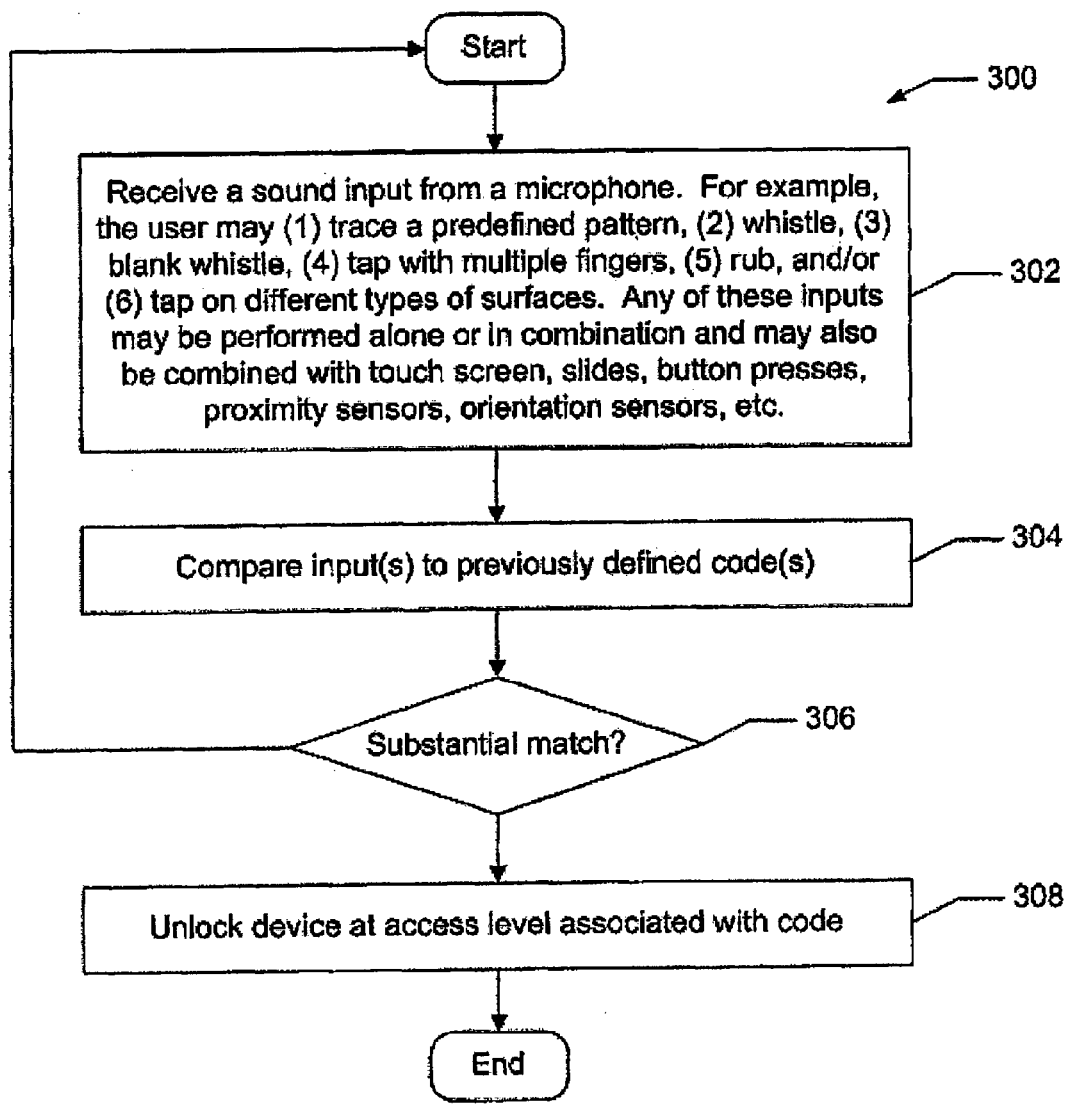
FIG. 3 is a flowchart showing one example of a process for unlocking an electronic device.

Referring to FIGS. 1 and 2, a mobile electronic device 10 (e.g. a smartphone) includes a processing circuit 132 configured to implement a number of applications. Processing circuit 132 is designed to control various other circuits such as information displayed on display 114. Processing circuit 132 may control this information based on inputs received from various user input devices 131 of device 10. For example, inputs may be from hard keys 4, 6, 8, 9, 11, 19, 20, 22, a touch screen 3, voice or other sound based commands from a microphone 25 or a microphone connected to headset jack 23, and/or from some other user input device 131.

The actions taken by device 10 (e.g. commands executed, information displayed, etc.) in response to inputs on the user input devices 131 may be protected by a password sequence. For example, device 10 may require a predefined tapping sequence be detected by a touch screen and/or microphone to unlock the device 10.

These actions may further be limited based on the context associated with device 10. For example, context may include the location in which the device 10 is being used (e.g. pointing device 10 in different directions means different things in different places). The location of device 10 may be supplied by a location circuit 124 of device 10. As another example, context may also be provided by determining what other devices 150 are in the vicinity of device 10 (e.g. a Bluetooth stereo in proximity to device 10 may signal that the device is being pointed at the stereo to control the stereo). As another example, an array of devices can be detected and the relative strengths of signals from the array of devices can be used to determine one or both of the position of the device and the orientation of the device (e.g. if an antenna's reception of signals—e.g. strength—is better in one orientation with respect to a transmitting source than other orientations, the orientation of the device may be deduced through the detection of several devices and their signal strengths). Other devices 150 being in proximity may be determined by data received on a network transceiver 144 such as a Bluetooth transceiver and/or a WiFi transceiver. As still another example, context may be provided based on time information (e.g. certain actions may be taken during specific portions of the day and/or during certain dates so orientation information may be less helpful for taking those actions during other times). Time information may be provided by a clock circuit such as a clock of a microprocessor 126, from a GPS signal, and/or from another source. The time information may be compared to data stored in a calendar application to provide further.

The mobile device 10 may be a mobile computing device capable of executing software programs. The device 10 may be implemented as a combination handheld computer and mobile telephone, sometimes referred to as a smart phone. Examples of smart phones include, for example, Palm™ products such as Palm® Treo™ smart phones. Although some embodiments may be described with mobile device 10 implemented as a smart phone by way of example, it may be appreciated that the embodiments are not limited in this context. For example, mobile device 10 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, camera, pager, messaging device, data communication device, and so forth.

Processing circuit 132 of hand-held device 10 may include one or more of a microprocessor 126, second microprocessor 126, image processing circuit 116, display driver 118, a memory (e.g. non-volatile memory—NVM) controller 128, audio driver 122 (e.g. D/A converter, A/D converter, an audio coder and/or decoder (codec), amplifier, etc.), and other processing circuits. Processing circuit 132 can include various types of processing circuitry, digital and/or analog, and may include one or more of a microprocessor, microcontroller, application-specific integrated circuit (ASIC), field programmable gate array (FPGA), or other circuitry configured to perform various input/output, control, analysis, and other functions. In various embodiments, the processing circuit 132 may include a central processing unit (CPU) using any suitable processor or logic device, such as a as a general purpose processor. Processing circuit 132 may include, or be implemented as, a chip multiprocessor (CMP), dedicated processor, embedded processor, media processor, input/output (I/O) processor, co-processor, a microprocessor such as a complex instruction set computer (CISC) microprocessor, a reduced instruction set computing (RISC) microprocessor, and/or a very long instruction word (VLIW) microprocessor, a processor implementing a combination of instruction sets, a controller, a microcontroller, an application specific integrated circuit (ASIC), a field programmable gate array (FPGA), a programmable logic device (PLD), or other processing device in accordance with the described embodiments.

Processing circuit 132 may be configured to digitize data, to filter data, to analyze data, to combine data, to output command signals, and/or to process data in some other manner. Processing circuit 132 may be configured to perform digital-to-analog conversion (DAC), analog-to-digital conversion (ADC), modulation, demodulation, encoding, decoding, encryption, decryption, etc. Processing circuit 132 (e.g. an applications microprocessor 126) may be configured to execute various software programs such as application programs and system programs to provide computing and processing operations for device 10.

Processing circuit 132 may also include a memory that stores data. Processing circuit may include only one of a type of component (e.g. one microprocessor), or may contain multiple components of that type (e.g. multiple microprocessors). Processing circuit 132 could be composed of a plurality of separate circuits and discrete circuit elements. In some embodiments, processing circuit 132 will essentially comprise solid state electronic components such as a microprocessor (e.g. microcontroller). Processing circuit 132 may be mounted on a single board in a single location or may be spread throughout multiple locations which cooperate to act as processing circuit 132. In some embodiments, processing circuit 132 may be located in a single location (e.g. in proximity and/or on a common circuit carrying element such as a circuit board) and/or all the components of processing circuit 132 will be closely connected.

Components shown as part of a single processing circuit 132 in the figures may be parts of separate processing circuits in various embodiments covered by the claims unless limited by the claim to a single processing circuit (e.g. location circuit 124 may be part of a separate assembly having a separate microprocessor that interfaces with processing circuit 132 through data port 140).

Hand-held device 10 may also include a network transceiver 144. Transceiver 144 may operate using one or more of a LAN standard, a WLAN standard, a Bluetooth standard, a Wi-Fi standard, an Ethernet standard, and/or some other standard. Network transceiver 144 may be a wireless transceiver such as a Bluetooth transceiver and/or a wireless Ethernet transceiver. Wireless transceiver 144 may operate using an IEEE 802.11 standard. Hand-held device 10 may also include an external device connector 140 (such as a serial data port) for transferring data. External device connector 140 may also serve as the connector 135 between power supply circuit 152 and an external power supply. Hand-held device 10 may contain more than one of each of transceiver 144 and external device connector 140. For example, network transceiver 144 may include both a Bluetooth and an IEEE 802.11 transceiver.

Network transceiver 144 may be arranged to provide voice and/or data communications functionality in accordance with different types of wireless network systems. Examples of wireless network systems may include a wireless local area network (WLAN) system, wireless metropolitan area network (WMAN) system, wireless wide area network (WWAN) system, and so forth. Examples of wireless network systems offering data communication services may include the Institute of Electrical and Electronics Engineers (IEEE) 802.xx series of protocols, such as the IEEE 802.11a/b/g/n series of standard protocols and variants (sometimes referred to as "WiFi"), the IEEE 802.16 series of standard protocols and variants (sometimes referred to as "WiMAX"), the IEEE 802.20 series of standard protocols and variants, and so forth.

Hand-held device 10 may be capable of operating as a mobile phone. The mobile phone may use transceiver 144 and/or may use a cellular transceiver 136. Cellular transceiver 136 may be configured to operate as an analog transceiver, a digital transceiver (e.g. a GSM transceiver, a TDMA transceiver, a CDMA transceiver), or some other type of transceiver. Cellular transceiver 136 may be configured to transfer data (such as image files) and may be used to access the Internet 142 in addition to allowing voice communication. Cellular transceiver 136 may be configured to use one or more of an EV- technology (e.g. EV-DO, EV-DV, etc.), an EDGE technology, a WCDMA technology, and/or some other technology.

Transceiver 144 may be arranged to perform data communications in accordance with different types of shorter range wireless systems, such as a wireless personal area network (PAN) system. One example of a wireless PAN system offering data communication services includes a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), etc.—as well as one or more Bluetooth Profiles, etc. Other examples may include systems using an infrared technique.

Cellular transceiver 136 may provide voice communications functionality in accordance with different types of cellular radiotelephone systems. Examples of cellular radiotelephone systems may include Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) cellular radiotelephone systems, Extended-TDMA (E- TDMA) cellular radiotelephone systems, Narrowband Advanced Mobile Phone Service (NAMPS) cellular radiotelephone systems, third generation (3 G) systems such as Wide-band CDMA (WCDMA), CDMA-2000, Universal Mobile Telephone System (UMTS) cellular radiotelephone systems compliant with the Third-Generation Partnership Project (3 GPP), and so forth.

In addition to voice communications functionality, the cellular transceiver 136 may be arranged to provide data communications functionality in accordance with different types of cellular radiotelephone systems. Examples of cellular radiotelephone systems offering data communications services may include GSM with General Packet Radio Service (GPRS) systems (GSM/GPRS), CDMA/1×RTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth.

Hand-held device 10 may include one or more user input devices 131 (e.g. button, switch, touch screen, keyboard, keypad, voice command circuit, etc.) for registering commands from a user on device 10. Some or all of user input devices 131 may interface with a switch control circuit (not shown) configured to interpret which switches have been actuated. User input device 131 may include an alphanumeric keyboard. The keyboard may comprise, for example, a QWERTY key layout and an integrated number dial pad. A keyboard integrated into a hand-held device would typically be a thumb keyboard. User input device 131 may also include various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. Any of user input devices 131 may be concealable behind a body (e.g. a sliding body, a flip-out body, etc.) such that they are hidden when the body is in a first position and visible when the body is in the second position.

Hand-held device 10 may include one or more location determining circuits 124 (e.g. a GPS circuit and/or a cell-based location determining circuit) configured to determine the location of device 10. Device 10 may be configured to receive inputs from more than one location determining circuit 124. These inputs can be compared such that both are used, one (e.g. a cell-based system) can be used primarily when the other (e.g. GPS) is unable to provide reliable location information, or can have some other functional relationship.

Device 10 may use one or more different location determining techniques to derive the location of the device 10 based on the data from location determining circuit 124.

For example, device 10 may use one or more of Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFTL) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), and so forth.

Device 10 may also include an orientation circuit 160. Orientation circuit 160 may be one or more of any number of circuits configured to provide data indicative of an orientation of device 10 (e.g. of a direction in which device 10 is pointed). In some embodiments, orientation circuit 160 may be a compass sensor circuit configured to sense a magnetic field (e.g. Earth's magnetic field) that provides information indicative of an orientation of device 10, may include an accelerometer or other circuit responsive to Earth's gravitational field, may include one or more gyros, a multiple (e.g. two or three) antenna GPS system with sufficient resolution to determine orientation, a wireless receiver (e.g. a transceiver) that receives a signal from a beacon that is indicative of the relative orientation of the device to the beacon, and/or some other orientation circuit. In some embodiments, orientation circuit 160 may be separate from (although may be connected to) device 10 and provide orientation data to device 10 through a data link (e.g. through a wireless data link). In some embodiments, orientation circuit 160 may be configured to provide a continuous orientation when operation and receiving a relevant signal (e.g. a compass circuit, a multiple antenna GPS system, a WiFi positioning system, etc.) while in other embodiments orientation circuit 160 may only provide orientation information when some other parameter is met (e.g. a single antenna GPS system designed to provide general orientation information only when the device 10 is moving).

Hand-held device 10 may include one or more audio circuits 120 (e.g. speakers, microphone, etc.) for providing or receiving audio information to or from a user. In one example, hand-held device 10 includes a first speaker 120 designed for regular phone operation. Hand-held device 10 may also include a second speaker 120 for louder applications such as speaker phone operation, music or other audio playback (e.g. an mp3 player application), etc. Hand-held device 10 may also include one or more audio ports 120 (e.g. a headphone connector) for output to an external speaker and/or input from an external microphone. Audio circuit 120 may be under the control of one or more audio drivers 122 which may include D/A converters and/or an amplifier.

Hand-held device 10 may include a camera 112 for taking pictures using device 10. Camera 112 may include a CCD sensor, a CMOS sensor, or some other type of image sensor capable of obtaining an image (particularly, images sensors capable of obtaining an image formed as an array of pixels). The image sensor may have a resolution of at least about 65,000 pixels or at least about 1 megapixel. In some embodiments, the image sensor may have a resolution of at least about 4 megapixels. Camera 112 may also include read-out electronics for reading data from the image sensor. Image processing circuit 116 may be coupled to the camera 112 for processing an image obtained by the camera. This image processing may include format conversion (e.g. RGB to YCbCr), white balancing, tone correction, edge correction, red-eye reduction, compression, CFA interpolation, etc. Image processing circuit 116 may be dedicated hardware that has been optimized for performing image processing.

Hand-held device 10 may include a display 114 for displaying information to a user. Display 114 could be one or more of an LCD display (e.g. a touch-sensitive color thin-film transistor (TFT) LCD screen), an electroluminescent display, a carbon-nanotube-based display, a plasma display, an organic light emitting diode (OLED) display, and some other type of display. Display 114 may be a touch screen display such that a user may input commands by approaching (e.g. touching) display 114 (including touch screens that require a specialized device to input information). Display 114 may be a color display (e.g., 16 or more bit color display) or may be a non-color (e.g. monotone) display. Display 114 may be controlled by a display driver 118 that is under the control of a microprocessor 126. In some embodiments, display 114 may be used with a stylus. Display 114 may be used as an input to a handwriting recognizer application.

Hand-held device 10 may include a dedicated memory 134 fixed to device 10. Memory 134 may be implemented using any machine-readable or computer-readable media capable of storing data such as erasable or non-erasable memory, writeable or re-writeable memory, and so forth. Dedicated memory 134 may be a non-volatile memory, may be a volatile memory, or may include both volatile and non-volatile memories. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information. In one embodiment, fixed memory 134 is a non-volatile memory.

Although the memory 134 is shown as being separate from and external to processing circuit 132 some portion or the entire memory 134 may be included on the same integrated circuit as processing circuit 132 (e.g. the same integrated circuit as microprocessor 126).

Hand-held device 10 may include a removable memory port 138 configured to receive a removable memory medium, and/or other components. Removable memory port 138 may also serve as an external device connector 140. For example, removable memory port may be an SDIO card slot which can be used to receive memory cards, receive cards input and/or output data, and combined cards having both memory and input/output functions.

Memory 134 and/or memory 138 may be arranged to store one or more software programs to be executed by processing circuit 132. Dedicated memory 134 and removable memory 138 may be connected to and/or under the control of a common memory controller 128 such as a non-volatile memory controller. Memory controller 128 may be configured to control reading of data to and writing of data from dedicated memory 134 and/or removable memory 138.

Handheld device 10 may be configured to connect to one or more servers 146,148 via a network 142 (such as the Internet) using one or more of network transceiver 144, cellular transceiver 136, and external device connector 140.

Hand-held device 10 may also include a power supply circuit 152 configured to regulate power supply in hand-held device 10. Power supply circuit 152 may be configured to do one or more of control charging of battery 156, to communicate the amount of power remaining in battery 156, determine and/or communicate whether an external power supply is connected, switch between the external power supply and the battery, etc. Battery 156 may be a rechargeable battery and may be removable or may be fixed to device 10. Battery 156 may be formed from any number of types of batteries including silver-based batteries (e.g. silver-zinc, magnesium-silver-chloride, etc.), a lithium-based battery (e.g. lithium- ion, lithium-polymer, etc.), a nickel-based battery (nickel-cadmium, nickel-metal- hydride, etc.), zinc-based batteries (e.g. silver-zinc, carbon-zinc, etc.), etc. External power supply connector 135 may be configured to be connected to a direct current source, an alternating current source, or both DC and AC sources.

Device 10 may be configured to connect to the Internet 142, which may be a direct connection (e.g. using cellular transceiver 136, external device connector 140, or network transceiver 144) or may be an indirect connection (e.g. routed through external device 150). Device 10 may receive information from and/or provide information to the Internet. Device 10 may include a web browser configured to display information received from the Internet (including information which may be optimized by the browser for display on mobile device 10). Device 10 may connect to one or more remote servers 146,148 using the Internet. Device 10 could also connect to another personal electronic device 150 by way of the Internet.

Device 10 may comprise an antenna system (not illustrated) for transmitting and/or receiving electrical signals. Each of the transceivers 136, 144 and/or location circuit 124 may include individual antennas or may include a common antenna system. The antenna system may include or be implemented as one or more internal antennas and/or external antennas.

Mobile device 10 may comprise a subscriber identity module (SIM) coupled to processing circuit 132. The SIM may comprise, for example, a removable or non-removable smart card arranged to encrypt voice and data transmissions and to store user-specific data for allowing a voice or data communications network to identify and authenticate the user. The SIM may store data such as personal settings specific to the user.

Device 10 and/or processing circuit 132 may be configured to run any number of different types of applications. Examples of application programs may include, for example, a phone application (e.g. a telephone application, a voicemail application, a VoIP application, etc.), a messaging application (e.g. an e-mail application, an instant message (IM) application, a short message service (SMS) application, a multimedia message service (MMS) application), a web browser application, a personal setting application (e.g. a personal information manager (PIM) application), a contact management application, a calendar application (e.g. a calendar application, a scheduling application, etc.), a task management application, a document application (e.g. a word processing application, a spreadsheet application, a slide application, a document viewer application, a database application, etc.), a location application (e.g. a positioning application, a navigation application, etc.), an image application (e.g. a camera application such as a digital camera application and/or a video camera application, an image management application, etc.) including media player applications (e.g. a video player application, an audio player application, a multimedia player application, etc.), a gaming application, a handwriting recognition application, and so forth. The application software may provide a graphical user interface (GUI) to communicate information between the mobile device 10 and a user.

The hand-held portable computing device 10 (e.g. a mobile computing device such as a smartphone) includes a number of user input devices 131. The user input devices include a send button 4 configured to select options appearing on display 3 and/or send messages, a 5-way navigator 5 configured to navigate through options appearing on display 3, a power/end button 6 configured to select options appearing on display 3 and to turn on display 3, a phone button 7 usable to access a phone application screen, a calendar button 8 usable to access a calendar application screen, a messaging button 9 usable to access a messaging application screen, an applications button 60 usable to access a screen showing available applications, a thumb keyboard 11 (which includes a phone dial pad 12 usable to dial during a phone application), a volume button 19 usable to adjust the volume of audio output of device 10, a customizable button 20 which a user may customize to perform various functions, a ringer switch 22 usable to switch the smartphone from one mode to another mode (such as switching from a normal ringer mode to a meeting ringer mode), and a touch screen display 3 usable to select control options displayed on display 3. Touch screen display 3 is also a color LCD display 114 having a TFT matrix.

Smartphone 10 also includes audio circuits 120. The audio circuits 120 include phone speaker 2 usable to listen to information in a normal phone mode, external speaker 16 louder than the phone speaker (e.g. for listening to music, for a speakerphone mode, etc.), headset jack 23 to which a user can attach an external headset which may include a speaker and/or a microphone, and microphone 25 which can be used to pick up audio information such as the user's end of a conversation during a phone call.

Smartphone 10 also includes a status indicator 1 that can be used to indicate the status of Smartphone 10 (such as messages pending, charging, low battery, etc.), a stylus slot 13 for receiving a stylus such as a stylus usable to input data on touch screen display 3, a digital camera 15 (see camera 112) usable to capture images, a mirror 14 positioned proximate camera 15 such that a user may view themselves in mirror 14 when taking a picture of themselves using camera 15, a removable battery 18 (see battery 156), and a connector 24 (see external data connector 140 and external power supply connector 135) which can be used to connect device 10 to either (or both) an external power supply such as a wall outlet or battery charger or an external device such as a personal computer, a gps unit, a display unit, or some other external device.

Smartphone 10 also includes an expansion slot 21 (see removable memory 138) which may be used to receive a memory card and/or a device which communicates data through slot 21, and a SIM card slot 17, located behind battery 18, configured to receive a SIM card or other card that allows the user to access a cellular network.

In various embodiments device 10 may include a housing 40. Housing 40 could be any size, shape, and dimension. In some embodiments, housing 40 has a width 52 (shorter dimension) of no more than about 200 mm or no more than about 100 mm. According to some of these embodiments, housing 40 has a width 52 of no more than about 85 mm or no more than about 65 mm. According to some embodiments, housing 40 has a width 352 of at least about 30 mm or at least about 50 mm. According to some of these embodiments, housing 40 has a width 52 of at least about 55 mm.

In some embodiments, housing 40 has a length 54 (longer dimension) of no more than about 200 mm or no more than about 150 mm. According to some of these embodiments, housing 40 has a length 54 of no more than about 135 mm or no more than about 125 mm. According to some embodiments, housing 40 has a length 54 of at least about 70 mm or at least about 100 mm. According to some of these embodiments, housing 40 has a length 54 of at least about 110 mm.

In some embodiments, housing 40 has a thickness 50 (smallest dimension) of no more than about 150 mm or no more than about 50 mm. According to some of these embodiments, housing 40 has a thickness 50 of no more than about 30 mm or no more than about 25 mm. According to some embodiments, housing 40 has a thickness 50 of at least about 10 mm or at least about 15 mm. According to some of these embodiments, housing 40 has a thickness 50 of at least about 50 mm.

A flowchart of an example process 300 for unlocking an electronic device, such as a smartphone or door lock, is presented in FIG. 3. Preferably, the process 300 is embodied in one or more software programs which are stored in one or more memories and executed by one or more processors. Although the process 300 is described with reference to the flowchart illustrated in FIG. 3, it will be appreciated that many other methods of performing the acts associated with process 300 may be used. For example, the order of many of the steps may be changed, and some of the steps described may be optional.

In general, the process 300 receives a sound input from a fixed position microphone and determines if the device should be unlocked based on a comparison of the sound input with a previously defined sound input. The process 300 begins by receiving the sound input from the user (block 302). For example, the user may trace a predefined pattern such as a circle, a star, or a swirl anywhere on the housing of the device. The surface used by the user is not limited to a touch panel or a touch screen. The relative distance from the origin of the sound (e.g., the user's finger or stylus) to the microphone may be calculated by the relative amplitude of the sound in a well know manner (see varying amplitude sound inputs in FIG. 4).

In another example, the user may whistle and/or blank whistle a tune into or near the microphone. Blank whistling is blowing without actually producing the whistle sound. The device may then sense the pressure rhythm for comparison to the user's code.

In another example, the user may tap a pattern using multiple fingers. Again, the relative distance from the origin of the sound (e.g., the user's finger or stylus) to the microphone may be calculated by the relative amplitude of the sound in a well know manner. As a result, the beat as well as the amplitude (e.g., two fingers tapping at different distances from the microphone) need to be decoded (see varying beat sound inputs in FIG. 4).

In another example, the user may rub his/her finger across the microphone in a predefined pattern. For example, the unlock code may be to rub left to right, the right to left, then right to left again. In some embodiments, a plurality of microphones located in different fixed positions may be used to determine rubbing direction. Again, this may be accomplished using relative amplitude in a well know manner.

In another example, the user may tap a pattern on different types of surfaces. The surfaces may be located on the device housing and/or not on the device housing. For example, the user may run his finger across a certain portion of a keyboard of the device, and/or the user may tap his/her finger (and/or the device itself) on one or more external surfaces made of different materials such as a wood table, a plastic cup, a glass window, and/or a metal surface.

Any of these inputs may be performed alone or in combination and may also be combined with touch screen inputs, slider phone slides (partial or whole slides), button presses, proximity sensors, orientation sensors, etc. For example, to prevent unintentional unlocking (e.g., by other things in a pocket making contact with the phone), the user may be required to press and/or hold a certain button while performing the sound input. In another example, the unlock code may be to hold the device horizontally, tap a certain sequence, hold the device vertically, and slide the phone open. In another example, the unlock code may be to hover a finger over the device and make a gesture for the proximity sensor (e.g. a no-no gesture), tap the side of the device three times, and then blow air into the microphone for at least 1.5 seconds.

Once an input sequence is received, the device compares the input(s) to previously defined code(s). (block 304). If there is a substantial match to a correct code (block 306), the device is unlocked (block 308). It will be appreciated that the device may require an exact match or a just a substantial match. For example, if the correct code is three taps of amplitude X each separated by Y milliseconds, the device may accept amplitudes and timings that are within some percentage (e.g., 20%) of the correct amplitudes and timings. In addition, the device may accept more than one different code for different levels of unlock. For example, one code may simply allow phone calls, while another code may fully unlock all features of the device (e.g., calendars, phonebooks, etc.).

Figure 4:
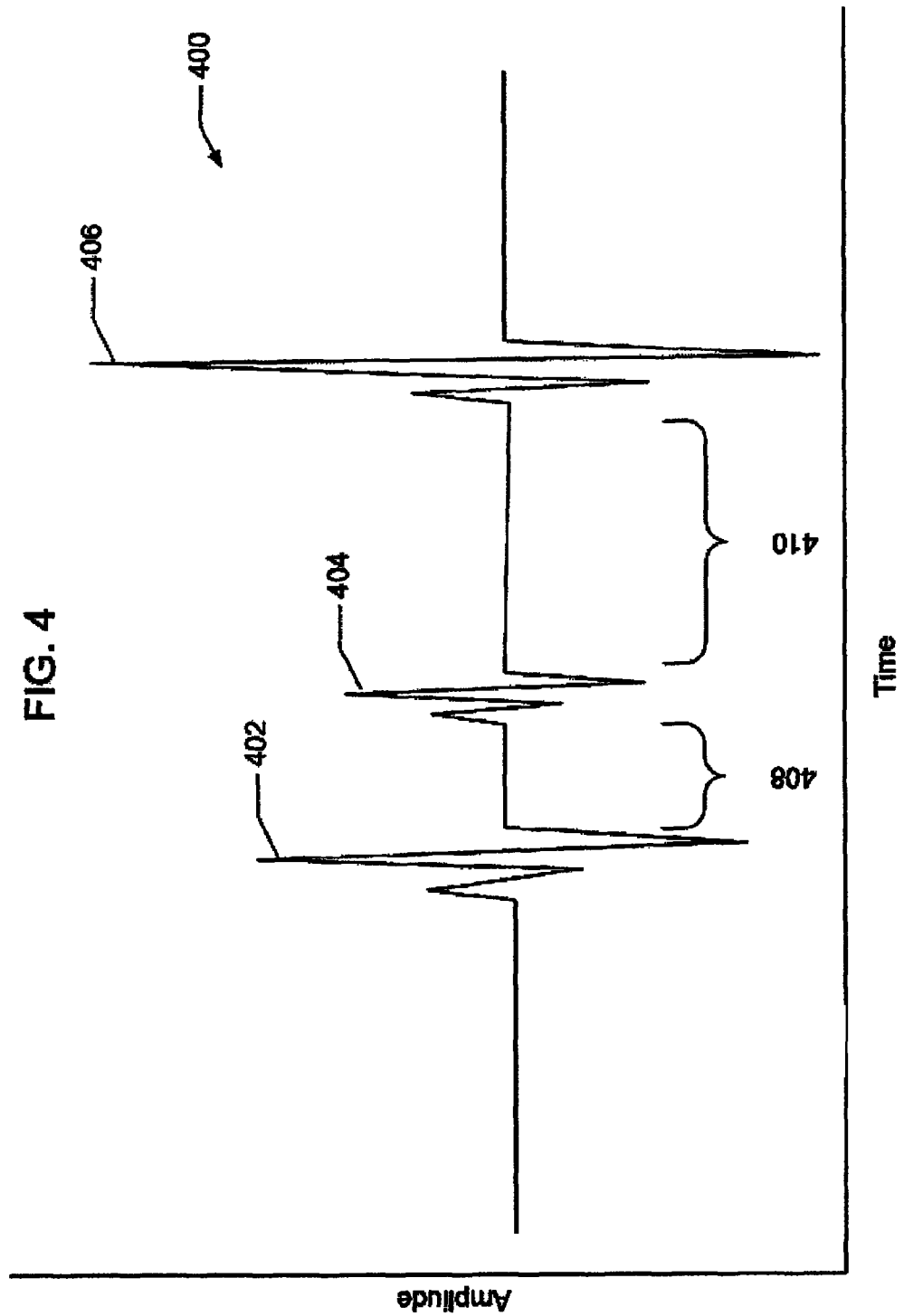
FIG. 4 is a diagram illustrating an example sound input.

An example sound input 400 is illustrated in FIG. 4. In this example, three taps are detected. The peak of a first tap 402 is at relatively medium amplitude. The peak of a second tap 404 is at relatively low amplitude. The peak of a third tap 406 is at relatively high amplitude. The time interval 408 between the first tap 402 and the second tap 404 is relatively short. The time interval 410 between the second tap 404 and the third tap 406 is relatively long.

In summary, persons of ordinary skill in the art will readily appreciate that methods and apparatus for unlocking an electronic device. The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

The invention claimed is:

1. A method of unlocking an electronic device, the method being performed by one or more processors and comprising:
   receiving a sound input from a microphone associated with the electronic device;
   comparing the received sound input to a previously stored sound code by:
      (i) determining a first plurality of peak amplitudes associated with the sound input;
      (ii) determining a first plurality of time intervals associated with the first plurality of peak amplitudes;
      (iii) determining whether the first plurality of peak amplitudes substantially matches a second plurality of peak amplitudes associated with the previously stored sound code; and
      (iv) determining whether the first plurality of time intervals substantially matches a second plurality of time intervals associated with the second plurality of peak amplitudes; and
   unlocking the electronic device in response to determining that (i) the first plurality of peak amplitudes substantially matches the second plurality of peak amplitudes, and (ii) the first plurality of time intervals substantially matches the second plurality of time intervals.

2. The method of claim 1, wherein receiving the sound input from the microphone includes receiving the sound input from a user tracing a pattern on the electronic device.

3. The method of claim 1, wherein receiving the sound input from the microphone includes receiving the sound input from a user whistling in to the microphone.

4. The method of claim 1, wherein receiving the sound input from the microphone includes receiving the sound input from a user blank whistling in to the microphone.

5. The method of claim 1, wherein receiving the sound input from the microphone includes receiving the sound input from a user tapping a pattern on the electronic device using a plurality of different fingers at a plurality of different locations on the electronic device.

6. The method of claim 1, wherein receiving the sound input from the microphone includes receiving the sound input from a user rubbing a finger across the microphone.

7. The method of claim 1, wherein receiving the sound input from the microphone includes receiving the sound input from a user tapping a pattern on a plurality of different surfaces made of a plurality of different materials.

8. An electronic device comprising:
   a processor;
   a display device coupled to the processor;
   a microphone coupled to the processor; and
   a memory resource coupled to the processor, the memory device storing software instructions to cause the processor to:
      receive a sound input from the microphone;
      compare the received sound input to a previously stored sound code by:
         (i) determining a first plurality of peak amplitudes associated with the sound input;
         (ii) determining a first plurality of time intervals associated with the first plurality of peak amplitudes;
         (iii) determining whether the first plurality of peak amplitudes substantially matches a second plurality of peak amplitudes associated with the previously stored sound code; and
         (iv) determining whether the first plurality of time intervals substantially matches a second plurality of time intervals associated with the second plurality of peak amplitudes; and
      unlock the electronic device in response to determining that (i) the first plurality of peak amplitudes substantially matches the second plurality of peak amplitudes, and (ii) the first plurality of time intervals substantially matches the second plurality of time intervals.

9. The electronic device of claim 8, wherein the software instructions are structured to cause the processor to receive the sound input from the microphone by receiving the sound input from a user tracing a pattern on the electronic device.

10. The electronic device of claim 8, wherein the software instructions are structured to cause the processor to receive the sound input from the microphone by receiving the sound input from a user whistling in to the microphone.

11. The electronic device of claim 8, wherein the software instructions are structured to cause the processor to receive the sound input from the microphone by receiving the sound input from a user blank whistling in to the microphone.

12. The electronic device of claim 8, wherein the software instructions are structured to cause the processor to receive the sound input from the microphone by receiving the sound input from a user tapping a pattern on the electronic device using a plurality of different fingers at a plurality of different locations on the electronic device.

13. The electronic device of claim 8, wherein the software instructions are structured to cause the processor to receive the sound input from the microphone by receiving the sound input from a user rubbing a finger across the microphone.

14. The electronic device of claim 8, wherein the software instructions are structured to cause the processor to receive the sound input from the microphone by receiving the sound input from a user tapping a pattern on a plurality of different surfaces made of a plurality of different materials.

15. A non-transitory computer readable device storing software instructions that, when executed by a processor, causes the processor to perform steps comprising:
   receiving a sound input from a microphone associated with an electronic device;
   comparing the received sound input to a previously stored sound code by:
      (i) determining a first plurality of peak amplitudes associated with the sound input;
      determining a first plurality of time intervals associated with the first plurality of peak amplitudes;
      (iii) determining whether the first plurality of peak amplitudes substantially matches a second plurality of peak amplitudes associated with the previously stored sound code; and
      (iv) determining whether the first plurality of time intervals substantially matches a second plurality of time intervals associated with the second plurality of peak amplitudes; and
   unlock the electronic device in response to determining that (i) the first plurality of peak amplitudes substantially matches the second plurality of peak amplitudes, and (ii) the first plurality of time intervals substantially matches the second plurality of time intervals.

16. The computer readable device of claim 15, wherein the software instructions are structured to cause the computing device to receive the sound input from the microphone by receiving the sound input from a user tracing a pattern on the electronic device.

17. The computer readable device of claim 15, wherein the software instructions are structured to cause the computing device to receive the sound input from the microphone by receiving the sound input from a user whistling in to the microphone.

18. The computer readable device of claim 15, wherein the software instructions are structured to cause the computing device to receive the sound input from the microphone by receiving the sound input from a user blank whistling in to the microphone.

19. The computer readable device of claim 15, wherein the software instructions are structured to cause the computing device to receive the sound input from the microphone by receiving the sound input from a user tapping a pattern on the electronic device using a plurality of different fingers at a plurality of different locations on the electronic device.

20. The computer readable device of claim 15, wherein the software instructions are structured to cause the computing device to receive the sound input from the microphone by receiving the sound input from a user rubbing a finger across the microphone.

21. The computer readable device of claim 15, wherein the software instructions are structured to cause the computing device to receive the sound input from the microphone by receiving the sound input from a user tapping a pattern on a plurality of different surfaces made of a plurality of different materials.

* * * * *

UNITED STATES PATENT AND TRADEMARK OFFICE
CERTIFICATE OF CORRECTION

PATENT NO. : 8,452,260 B2  Page 1 of 1
APPLICATION NO. : 12/731891
DATED : May 28, 2013
INVENTOR(S) : Matsuoka It is certified that error appears in the above-identified patent and that said Letters Patent is hereby corrected as shown below:

In the Claims

In column 12, line 43, in Claim 15, before "determining" insert -- (ii) --.

Signed and Sealed this
First Day of October, 2013

Teresa Stanek Rea
*Deputy Director of the United States Patent and Trademark Office*